United States Patent [19]

Onopchenko et al.

[11] 3,870,734

[45] Mar. 11, 1975

[54] PRODUCTION OF MIXTURES OF CARBOXYLIC ACIDS FROM MIXTURES OF OLEFINS

[75] Inventors: Anatoli Onopchenko, Monroeville; Johann G. D. Schulz, Pittsburgh, both of Pa.

[73] Assignee: Gulf Research & Development Company, Pittsburgh, Pa.

[22] Filed: June 5, 1973

[21] Appl. No.: 367,178

[52] U.S. Cl. ............................................. 260/413
[51] Int. Cl. ................................................ C08h 17/36
[58] Field of Search ................................... 260/413

[56] References Cited
UNITED STATES PATENTS 3,053,869  9/1962  McAlister et al. .................. 260/413
3,059,005  10/1962  Van De Vusse et al. ............ 260/413
3,167,585  1/1965  Anderson et al. ................ 260/413 X

*Primary Examiner*—Lewis Gotts
*Assistant Examiner*—Ethel G. Love

[57] ABSTRACT

A process for producing a mixture of carboxylic acids from a mixture of olefins having from 24 to 40 carbon atoms, preferably from a mixture of olefins having from 24 to 28 carbon atoms, which involves adding the mixture of olefins in a selected carrier to carbon monoxide and sulfuric acid and thereafter adding water to the reaction product so formed.

15 Claims, No Drawings

PRODUCTION OF MIXTURES OF CARBOXYLIC ACIDS FROM MIXTURES OF OLEFINS

This invention relates to a process for producing carboxylic acids from a mixture of olefins having from 24 to 40 carbon atoms, preferably a mixture of olefins having from 24 to 28 carbon atoms.

In U.S. Pat. No. 2,831,877 to Koch there is disclosed a process for preparing carboxylic acids which involves reacting olefins and carbon monoxide in the liquid phase without the addition of water and in the presence of acid catalysts containing little or no water, such as sulfuric acid, and thereafter taking up the reaction product in water. Although Koch makes no mention of the effect of a solvent or diluent in his process, the reaction involving a lower olefin is carried out, with no seeming preference, with and without a solvent of diluent, but with a higher olefin, such as a $C_{12}$ or higher olefin, with a solvent or diluent, such as paraffins from the Fischer-Tropsch synthesis or n-hexane.

In our application Ser. No. 367,176, entitled PRODUCTION OF CARBOXYLIC ACIDS FROM OLEFINS AND MIXTURES OF OLEFINS, filed concurrently herewith, we have discovered, unexpectedly, that when the olefin charge has from 16 to 20 carbon atoms or comprises a mixture of olefins having from 20 to 24 carbon atoms, increased selectivities to desired carboxylic acids are obtained if the reaction is carried out in the absence of a solvent or diluent.

When mixtures containing olefins having from 24 to 40 carbon atoms, specifically mixtures containing olefins having from 24 to 28 carbon atoms, are used in such process, however, difficulties occur, since these mixtures are solids at normal operating temperatures. It is well-known that for reaction to occur, intimate contact between all the reactants is essential which can be obtained if all reactants are in the liquid state. In the case of these solid olefins, it might be feasible to operate at the melting point of the olefin which in this case as a liquid can be well dispersed in a reaction mixture. However, at the temperatures required for liquefaction, numerous side reactions, such as sulfation and dimerization occur, resulting in decreased yields of the desired carboxylation product. The addition of the waxy olefin mixture in the form of finely-divided solid particles, such as a powder, is mechanically difficult and impractical. If the waxy olefinic mixture is pumped into the reaction zone as a heated liquid, solidification of the waxy mixture into large lumps occurs at the reactor temperature. In the latter case, there is also the inconvenience of possible line and pump plugging by the solidifying wax mixture.

A practical solution would appear to involve introducing the olefinic mixture into the reaction zone by means of a liquid carrier that would be inert under the reaction conditions. Most aromatic liquids, for example, would be excluded, since they could readily be sulfonated or alkylated under carboxylation conditions. Other liquids containing functional groups, such as aldehydes, alcohols, ketones, etc., must also be excluded, since these can react with sulfuric acid and form undesirable condensation products, such as tars, resins, etc.

We have found, unexpectedly, that certain selected carriers having substantially no solvent power for the waxy olefin mixture can be used herein to obtain the desired carboxylation product in high selectivities. These carriers are hydrocarbons (containing solely carbon and hydrogen atoms) in which less than about 6 grams of the solid olefin feed will dissolve therein at a temperature of about 26° C. and atmospheric pressure preferably from about 0.1 to about 5 grams of the wax mixture per 100 grams of the carrier.

Indiscriminate contacting of the reagents in the presence of such carriers, however, will not suffice. Instead, it is imperative that the waxy olefinic mixture reagent used herein be introduced with and by means of the carrier followed by heating and stirring the resultant mixture to a temperature ranging from about 35° to about 150° C., preferably from about 45° to about 100° C., for about 0.1 to about 30 minutes, preferably about 1 to about 10 minutes. Under these conditions, the carrier and the waxy olefinic mixture, though immiscible with each other, will be in a fluid dispersed state in which they are then introduced into the reaction zone containing sulfuric acid and carbon monoxide. Upon entry into the reaction zone, which has a lower temperature than the entering fluid mixture, the waxy olefinic mixture will solidify into exceedingly small particles to provide the large interfaces required for the contact with sulfuric acid and carbon monoxide to obtain competitive rates for the formation of the desired carboxylation product.

Carriers which can be used herein include n-hexane, n-heptane, n-octane, 2-methylheptane, 2,2,4-trimethylpentene, 1,1-bis(4-methylcyclohexyl)ethane, 1,1-bis(3,4-dimethylcyclohexyl)-ethane, etc.

The suitability of carriers that can be used herein was determined as follows: In a 100-milliliter graduated cylinder fitted with a standard taper stopper there was added a weighed amount of a $C_{24}$ to $C_{28}$ alpha olefin mixture, defined hereinafter, followed by carrier. Additional olefin mixture or carrier was added, as needed, until the mixture was just turbid. All solutions were mechanically shaken at atmospheric pressure and at 26° C. The results obtained with several representative carriers are shown below in Table I.

Table I

| Carrier | Grams Carrier Used | Weight Of $C_{24}$-$C_{28}$ Olefin Mixture Used | Weight Of Olefin Per 100 Grams Of Carrier |
|---|---|---|---|
| n-hexane | 69.1 | 2.6 | 3.8 |
| n-heptane | 23.3 | 0.9 | 3.9 |
| 1,1-bis-(4-methyl-cyclohexyl)ethane | 51.1 | 2.2 | 4.2 |
| methylcyclohexane | 28.1 | 1.8 | 6.4 |
| carbon tetrachloride | 55.0 | 3.6 | 6.7 |
| tetrahydrofuran | 45.6 | 4.1 | 9.0 |
| n-decane | 70.1 | 8.0 | 11.5 |
| cyclohexane | 49.5 | 5.8 | 11.7 |

The olefins present in the mixtures herein are either alpha olefins, internal olefins obtained by a disproportionation reaction involving two lower olefins, as, for example, in U.S. Pat. No. 3,595,920 to Ellis et al. or branched internal olefins obtained as a result of dimerizing lower olefins using a Ziegler catalyst, such as triethylaluminum, as, for example, in British Pat. No.

742,642 to Karl Ziegler, each of which has from 24 to 40 carbon atoms, preferably from 24 to 28 carbon atoms. When the olefins in the mixture being reacted have from 24 to 40 carbon atoms, the individual olefins can be present in the following amounts, in which the alpha olefin content is at least 50 weight per cent:

| Olefin Carbon Number | Percent By Weight | |
|---|---|---|
| | Broad Range | Preferred Range |
| 24 | 0.3 to 1.0 | 0.4 to 0.8 |
| 26 | 3.5 to 11.3 | 4.9 to 9.1 |
| 28 | 8.4 to 26.9 | 11.0 to 20.5 |
| 30 | 9.2 to 29.4 | 12.9 to 23.9 |
| 32 | 7.7 to 24.6 | 10.8 to 20.0 |
| 34 | 6.4 to 20.3 | 8.9 to 16.5 |
| 36 | 4.8 to 15.2 | 6.7 to 12.3 |
| 38 | 3.7 to 11.7 | 5.1 to 9.5 |
| 40 | 2.8 to 9.0 | 3.9 to 7.3 |

When the olefin mixture contains olefins having from 24 to 28 carbon atoms, the individual olefins can be present in the following amounts:

| Olefin Carbon Number | Percent By Weight | |
|---|---|---|
| | Broad Range | Preferred Range |
| 24 | 12.6 to 50.6 | 25.3 to 37.9 |
| 26 | 18.0 to 72.1 | 36.1 to 54.1 |
| 28 | 6.7 to 26.9 | 13.4 to 20.1 |

Specific examples of olefins that can be present in the above mixtures include 1-tetracosene, 2tetracosene, 3-tetracosene, 4-tetracosene, 5-tetracosene, 6-tetracosene, 7-tetracosene, 8-tetracosene, 9-tetracosene, 10-tetracosene, 11-tetracosene, 12-tetracosene, 1-pentacosene, 2-pentacosene, 3-pentacosene, 4-pentacosene, 5-pentacosene, 6-pentacosene, 7-pentacosene, 8-pentacosene, 9-pentacosene, 10-pentacosene, 11-pentacosene, 12-pentacosene, 13-pentacosene, 1-hexacosene, 2-hexacosene, 3-hexacosene, 4-hexacosene, 5-hexacosene, 6-hexacosene, 7-hexacosene, 8-hexacosene, 9-hexacosene, 10-hexacosene, 11-hexacosene, 12-hexacosene, 13-hexacosene, 1-heptacosene, 2-heptacosene, 3-heptacosene, 4-heptacosene, 5-heptacosene, 6-heptacosene, 7-heptacosene, 8-heptacosene, 9-heptacosene, 10-heptacosene, 11-heptacosene, 12-heptacosene, 13-heptacosene, 1-octacosene, 2-octacosene, 3-octacosene, 4-octacosene, 5-octacosene, 6-octacosene, 7-octacosene, 8-octacosene, 9-octacosene, 10-octacosene, 11-octacosene, 12-octacosene, 13-octacosene, 14-octacosene, 1-triacontene, 2-triacontene, 1-heneitriacontene, 2-heneitriacontene, 1-dotriacontene, 2-dotriacontene, 1-tritriacontene, 2-tritriacontene, 1-tetratriacontene, 2-tetratriacontene, 1-pentatriacontene, 2-pentatriacontene, 1-hexatriacontene, 2-hexatriacontene, 1-heptatriacontene, 2-heptatriacontene, 1-octatriacontene, 2-octatriacontene, 1-nonatriacontene, 2-nonatriacontene, 1-tetracontene, 2-tetracontene, 2-methyl-1-tricosene, 2-ethyl-1-docosene, 2-methyl-1-tetracosene, 2-ethyl-1-tricosene, 2-methyl-1-pentacosene, 2-ethyl-1-tetracosene, 2-methyl-1-hexacosene, 2-ethyl-1-pentacosene, 2-methyl-1-heptacosene, 2-ethyl-1-hexacosene, 2-methyl-1-octacosene, 2-ethyl-1-heptacosene, 2-methyl-1-nonacosene, 2-ethyl-1-octacosene, 2-methyl-1-triacontene, 2-ethyl-1-nonacosene, 2-methyl-1-heneitriacontene, 2-ethyl-1-triacontene, 2-methyl-1-dotriacontene, 2-ethyl-1-heneitriacontene, 2-methyl-1-dotriacontene, 2-ethyl-1-dotriacontene, 2-methyl-1-nonatriacontene, 2-ethyl-1-octatriacontene, etc.

In order to obtain high selectivity to desired carboxylic acid it is imperative that the mixture of olefins in the defined carrier be added to the reaction zone containing the catalyst and reactant carbon monoxide.

The catalyst used herein can be substantially 100 percent sulfuric acid, although it is preferred that aqueous sulfuric acid having a strength of about 92 to about 99 percent, preferably about 95 to 98 percent, be used.

The reaction is carried out under mild conditions of temperature and pressure. Thus, the temperature can be in the range of about −15° to about 75° C., preferably about 0° to about 40° C., and the pressure about 100 to about 5,000 pounds per square inch gauge (about seven to about 352 kilograms per square centimeter), preferably about 500 to about 2,000 pounds per square inch gauge (about 35.2 to about 140.8 kilograms per square centimeter). Reaction time of about 0.01 to about 12.0 hours, preferably about 0.1 to 4.0 hours will suffice.

At the end of the reaction period the reaction product is contacted with water to obtain the desired carboxylic acid. Temperature, pressure and reaction time similar to the above can be used in this step. The carboxylic acid will form a separate phase on the surface of the reaction mixture and can be recovered therefrom, for example, by decantation. If desired, recovery can be effected by distillation.

Thus, only five components are needed in the reaction zone in accordance with the process defined and claimed herein: the mixtures of olefins, the carrier therefor, carbon monoxide, sulfuric acid and water. In order to obtain the desired conversion at least equal molar amounts of the mixture of olefins, carbon monoxide, sulfuric acid and water are required.

As shown in our copending application Ser. No. 367,177, entitled COMPOSITION CONTAINING HIGHER FATTY ACIDS, filed concurrently herewith, when the olefin used in an alpha olefin or an olefin obtained by a disproportionation reaction the carboxylic acid obtained can be defined as falling within the following two general structures:

TERTIARY (NEO) CARBOXYLIC ACIDS

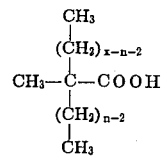

wherein $x$ is the number of carbon atoms in the reactant olefin, that is, from 24 to 40 carbon atoms and $n$ is the integer 2,3,4 up to $x/2$ for even integers between 24 and 40 and 2,3,4 up to $x+1/2$ for odd integers between 24 and 40, and

SECONDARY (ISO) CARBOXYLIC ACIDS

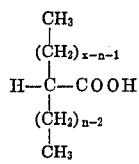

wherein $x$ is as defined above, and $n$ is the integer 2,3,4 up to $x/2$ for even integers between 24 and 40 and 2,3,4 up to $x+1/2$ for odd integers between 24 and 40. About half of the carboxylic acids obtained are tertiary and about half secondary. When a branched internal olefin is used, obtained as a result of dimerizing a lower alpha olefin, the carboxylic acid will be a tertiary carboxylic acid corresponding to the reactant olefin but having one more carbon atom with the carboxyl group being attached to a carbon carrying a methyl group and two additional alkyl substituents.

The process can be understood by reference to the following specific examples.

EXAMPLE I

Into a 316-stainless steel, magnetically-stirred autoclave there was added 440 grams of 97 percent aqueous sulfuric acid and 200 grams of a $C_{24}$ to $C_{28}$ alpha olefin mixture of the following carbon number composition:

| Olefin | Weight Percent |
|---|---|
| $C_{22}$ | 1.9 |
| $C_{24}$ | 31.6 |
| $C_{26}$ | 45.1 |
| $C_{28}$ | 16.8 |
| $C_{30}$ | 3.6 |
| $C_{32}$ | 1.0 |

Analysis of the olefin feed by infrared spectroscopy showed this mixture to be about 70 to 80 weight percent alpha olefins, 3 to 5 weight percent internal olefins, and 15 to 25 weight percent vinylidene olefin. For practical reasons, this mixture will be referred to herein as the "$C_{24}$ to $C_{28}$ alpha olefin mixture."

This mixture was heated for 3 hours at 29° C. under a carbon monoxide pressure of about 1,100 pounds per square inch gauge (77.5 kilograms per square centimeter). At the end of the reaction the crude product was drained into 1,000 grams of ice-water mixture. The autoclave was washed with 1 liter of n-hexane and the hexane washings were then combined with the product. The organic layer was separated from the aqueous layer in a separatory funnel and washed several times with hot solution of aqueous sodium chloride (15 weight percent) until final washings were neutral toward litmus paper. The low-boiling solvents were evaporated in a rotary evaporator, and the residue subjected to standard analytical procedures by titration and vapor phase chromatography. Analysis showed essentially no carboxylic acids in the product mixture.

EXAMPLE II

A total of 160 grams of the $C_{24}$ to $C_{28}$ alpha olefin mixture defined above was placed in the same autoclave used above, together with 160 grams of cyclohexane and 400 grams of 97 percent aqueous sulfuric acid. The autoclave was pressured with carbon monoxide to 950 pounds per square inch gauge pressure (66.9 kilograms per square centimeter) and allowed to react for 2 hours at 27° C. At the end of the run the contents of the autoclave was discharged into 1,000 milliliters of ice-water mixture and the layers that formed were separated by decantation in a separatory funnel. To break up the emulsions that resulted, 500 milliliters of isopropanol was added. The organic layer was washed several times with hot solution of aqueous sodium chloride (15 weight percent) until final washings were neutral toward litmus paper. Analysis of the resulting product (166.7 grams) showed that mixture contained at most 11 weight percent of $C_{23}$ to $C_{33}$ carboxylic acids.

EXAMPLE III

In this run, 400 grams of 97 percent aqueous sulfuric acid was placed in the same autoclave used above, pressured to about 950 pounds per square inch gauge (66.9 kilograms per square centimeter) with carbon monoxide. To the contents of the autoclave there was added over the course of 2.5 hours 160 grams of the $C_{24}$ to $C_{28}$ alpha olefin mixture defined above dispersed in 220 grams of cyclohexane. Final pressure in the autoclave after addition of reactants was 1,525 pounds per square inch gauge (107.6 kilograms per square centimeter). The temperature during the reaction was 27° C. Upon addition of water and work-up as above, 190.1 grams of an organic product was obtained. Analysis of this mixture showed approximately 18.6 percent efficiency to the desired $C_{23}$ to $C_{33}$ carboxylic acids.

EXAMPLE IV

Example III was repeated employing 400 grams of 97 percent aqueous sulfuric acid, 160 grams of $C_{24}$ to $C_{28}$ alpha olefin mixture and 160 grams of cyclohexane. On work-up as above, an efficiency of about 21 percent to the $C_{23}$ to $C_{33}$ carboxylic acids was obtained.

EXAMPLE V

Example II was repeated except that the pressure was maintained at 1,000 pounds per square inch gauge (70.5 kilograms per square centimeter) and 160 grams of n-hexane was used in place of cyclohexane. On work-up as before 163 grams of organic product was isolated. Analysis showed about 2 percent efficiency to the desired carboxylic acid mixture.

EXAMPLE VI

About 400 grams of 97 percent aqueous sulfuric acid was charged to the same autoclave used above and pressured with carbon monoxide to 960 pounds per square inch gauge (70 kilograms per square centimeter). While the temperature was maintained at 29° C., 160 grams of the same $C_{24}$ to $C_{28}$ alpha olefin mixture used above dispersed in 220 grams of n-hexane was added to the autoclave over a period of 2.5 hours. Final pressure in the autoclave reached 1,530 pounds per square inch gauge (107.7 kilograms per square centimeter) when the addition of reactants was completed. The contents of the autoclave were discharged into ice water and the organic layer was separated by decantation. The organic layer was washed several times with hot aqueous sodium chloride solution (15 weight percent) until the layer was neutral. The low-boiling components, including small amounts of isopropanol which were periodically added to break up emulsions that resulted, were removed by evaporation in a rotary evaporator. At times, simple heating was sufficient to obtain good separation. After work-up, a total of 183.5 grams of organic product was isolated. Analysis showed the product to contain 43.7 weight percent of the desired $C_{23}$ to $C_{33}$ carboxylic acids.

EXAMPLE VII

Example VI was repeated employing 400 grams of sulfuric acid, and 200 grams of $C_{24}$ to $C_{28}$ olefin mixture in 280 grams of n-hexane. Analysis of the product showed 38.6 percent efficiency to the desired acid mixture.

EXAMPLE VIII

The same autoclave used above was charged with 400 grams of 97 percent aqueous sulfuric acid and pressured with carbon monoxide to 910 pounds per square inch gauge (63 kilograms per square centimeter). While maintaining a temperature at 29° C., 160 grams of the same $C_{24}$ to $C_{28}$ alpha olefin mixture used above dispersed in 160 grams of 1,1-bis(4-methylcyclohexyl)ethane was gradually added to the reactor over a period of 3.5 hours. After addition of water to the prooduct and work-up as before, the resulting product was found to contain 44.3 percent efficiency to the desired carboxylic acid mixture. Total recovery of product, including the solvent, was 284.5 grams.

EXAMPLE IX

Example VI was repeated employing 400 grams of sulfuric acid, 255 grams of $C_{24}$ to $C_{28}$ alpha olefin mixture in 220 grams of tetrahydrofuran. The addition of olefin in a carrier was carried out over a 5-hour period while maintaining a temperature of 21°C. and carbon monoxide pressure of 1,220 pounds per square inch gauge (85.6 kilograms per square centimeter). Analysis showed insignificant amount of carboxylic acids formed (less than 1 percent). Final pressure in the autoclave after addition of reactants was completed was 1,450 pounds per square inch gauge (102 kilograms per square centimeter).

The above clearly shows the advantages of operating in accordance with the procedure defined and claimed herein. Note that batch operation is ineffective, whether it be in the absence of a carrier (Example I), with a carrier falling outside the definition of carrier herein (Example II) or even with a carrier falling within the definition of carier herein (Example V). When the process is carried out by introducing the defined olefin mixture reactant into the reactor together with a suitable carrier therefor, however, (Examples VI, VII and VIII), excellent selectivities to desired carboxylic acids were obtained. Repeating the process with carriers unsuitable herein (Examples III, IV and IX) proved to be unsatisfactory.

The carboxylic acids produced herein can be reacted with a polyalkylene polyamine to obtain a polyamide which can be added to a lubricating oil to improve its pour and detergency characteristics.

Obviously, may modifications and variations of the invention, as hereinabove set forth, can be made without departing from the spirit and scope thereof, and, therefore, only such limitations should be imposed as are indicated in the appended claims.

We claim:

1. A process for the production of carboxylic acids from mixtures of olefins having from 24 to 40 carbon atoms, sulfuric acid of at least 92 percent strength, carbon monoxide and water which comprises adding said mixture of olefins dispersed in a hydrocarbon carrier in which less than about 6 grams of said olefin mixture is soluble per 100 grams of said carrier while maintaining the same at a temperature of about 35° to about 150° C. to a reaction zone having a lower temperature than the entering fluid mixture containing carbon monoxide and said sulfuric acid, maintaining the resulting mixture at a temperature of about −15° to about 75° c., adding water to the reaction product so formed and thereafter recovering the desired carboxylic acid product.

2. The process of claim 1 in which from about 0.1 to about 5.0 grams of said carrier is soluble per 100 grams of said carrier.

3. The process of claim 1 wherein said carrier is n-hexane.

4. The process of claim 1 wherein said carrier is 1,1-bis-(4-methylcyclohexyl)ethane.

5. The process of claim 1 wherein said carrier is n-heptane.

6. The process of claim 1 wherein the olefins in the mixture have from 24 to 28 carbon atoms.

7. The process of claim 1 wherein said olefins are alpha olefins.

8. The process of claim 1 wherein the strength of the sulfuric acid is about 92 to about 99 percent.

9. The process of claim 1 wherein the strength of the sulfuric acid is about 95 to about 98 percent.

10. The process of claim 1 wherein the reaction pressure is in the range of about 100 to about 5,000 pounds per square inch gauge (about 7 to about 352 kilograms per square centimeter).

11. The process of claim 1 wherein the reaction temperature is in the range of about 0° to about 40° C. and the reaction pressure about 500 to about 2,000 pounds per square inch gauge (about 35.2 to about 140.8 kilograms per square centimeter).

12. The process of claim 1 wherein the individual olefins in the mixture fall within the ranges defined below:

| Olefin Carbon Number | Percent by Weight |
| --- | --- |
| 24 | 0.3 to 1.0 |
| 26 | 3.5 to 11.3 |
| 28 | 8.4 to 26.9 |
| 30 | 9.2 to 29.4 |
| 32 | 7.7 to 24.6 |
| 34 | 6.4 to 20.3 |
| 36 | 4.8 to 15.2 |
| 38 | 3.7 to 11.7 |
| 40 | 2.8 to 9.0 |

13. The process of claim 1 wherein the individual olefins in the mixture fall within the ranges defined below:

| Olefin Carbon Number | Percent By Weight |
|---|---|
| 24 | 0.4 to 0.88 |
| 26 | 4.9 to 9.1 |
| 28 | 11.0 to 20.5 |
| 30 | 12.9 to 23.9 |
| 32 | 10.8 to 20.0 |
| 34 | 8.9 to 16.5 |
| 36 | 6.7 to 12.3 |
| 38 | 5.1 to 9.5 |
| 40 | 3.9 to 7.3 |

14. The process of claim 6 wherein the individual olefins in the mixture fall within the ranges defined below:

| Olefin Carbon Number | Percent By Weight |
|---|---|
| 24 | 12.6 to 50.6 |
| 26 | 18.0 to 72.1 |
| 28 | 6.7 to 26.9 |

15. The process of claim 6 wherein the individual olefins in the mixture fall within the ranges defined below:

| Olefin Carbon Number | Percent By Weight |
|---|---|
| 24 | 25.3 to 37.9 |
| 26 | 36.1 to 54.1 |
| 28 | 13.4 to 20.1 |

* * * * *